(12) United States Patent
Schreiber et al.

(10) Patent No.: US 7,379,271 B1
(45) Date of Patent: May 27, 2008

(54) MULTILAYER GIMBAL SUSPENSION ELEMENT MANUFACTURE WITH CO-ETCHABLE LAYERS

(75) Inventors: Christopher Schreiber, Temecula, CA (US); Christopher Dunn, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 403 days.

(21) Appl. No.: 11/179,707

(22) Filed: Jul. 11, 2005

Related U.S. Application Data

(60) Provisional application No. 60/681,589, filed on May 16, 2005.

(51) Int. Cl.
G11B 21/16 (2006.01)
(52) U.S. Cl. .................................. 360/245.3
(58) Field of Classification Search ............. 360/244.3, 360/245.9, 245.3; 29/603.04; 324/95; 148/410, 148/556
See application file for complete search history.

(56) References Cited

U.S. PATENT DOCUMENTS

| | | | |
|---|---|---|---|
| 4,012,237 A * | 3/1977 | Whittenberger | ............. 148/556 |
| 4,863,808 A | 9/1989 | Sallo | |
| 5,612,840 A | 3/1997 | Hiraoka et al. | |
| 6,093,264 A * | 7/2000 | Hershberger et al. | ....... 148/410 |
| 6,171,714 B1 | 1/2001 | Bergkessel et al. | |
| 6,333,139 B1 | 12/2001 | Omote et al. | |
| 6,898,841 B2 * | 5/2005 | Shiraishi | .................. 29/603.04 |
| 6,903,541 B2 * | 6/2005 | Ziegner et al. | ................ 324/95 |
| 6,995,954 B1 * | 2/2006 | Coon | ........................ 360/245.9 |
| 2001/0001588 A1 * | 5/2001 | Matz | ........................ 360/245.9 |
| 2002/0181157 A1 * | 12/2002 | Serizawa et al. | ........ 360/245.9 |
| 2003/0053258 A1 * | 3/2003 | Dunn et al. | .............. 360/245.9 |
| 2003/0202283 A1 * | 10/2003 | Arya et al. | .............. 360/244.3 |

OTHER PUBLICATIONS

Clark, Donald S. & Varney, Wilbur R., Physical Metallurgy For Engineer, pp. 414-417, 2nd ed., D. Van Nostrand Company, Inc., Princeton, New Jersey (1972).
What is Monel and why does it cost so much? (from http://www.maxmax.com/fWhatIsMonel.htm) retrieved Jul. 27, 2004.

* cited by examiner

*Primary Examiner*—Tianjie Chen
(74) *Attorney, Agent, or Firm*—Intellectual Property Law Office of Joel D. Voelzke

(57) ABSTRACT

Shaping of a gimbal suspension element for a disk drive suspension using fewer process steps includes disposing an element, precursor assembly of a plastic film layer and a copper layer with an interlayer of a copper seed layer and a Monel alloy for etching, and etching the assembly with an etchant such as cupric chloride for both the alloy and the copper seed layer of the interlayer.

13 Claims, 4 Drawing Sheets

MULTILAYER GIMBAL SUSPENSION ELEMENT MANUFACTURE WITH CO-ETCHABLE LAYERS

CROSS-REFERENCE TO RELATED APPLICATIONS

This application claims the benefit of U.S. Provisional Application Ser. No. 60/681,589 filed May 16, 2005.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and more particularly to the manufacture of multilayer gimbal suspension elements for suspensions using fewer process steps through simultaneous etching of multiple layers heretofore etched separately.

2. Description of the Related Art

Some disk drive suspension wireless gimbal suspension elements convey electrical signals between the recording head and the associated external circuitry, and also provide a mechanical flexure function. There are two main configurations of these gimbal suspension elements. Both configurations are multilayer and typically comprise a stainless steel-polyimide-copper laminate. In one type, an initial laminate is progressively reduced to the gimbal suspension element, commonly referred to as the "subtractive" type, e.g. TSA and ILS. In the second type, generally referred to as the additive type, e.g. CIS, the laminate is built up using as the base a stainless steel foil and adding polyimide, and the adding to the polyimide metal conductive layers through sputtering or plating techniques.

The present processes for fabrication of these gimbal suspension elements involve process steps which expose the constituent materials to harsh chemicals and severe environments. The highly acidic or basic solutions used can degrade the bond interfaces between the assembled dissimilar materials. Highly accelerated stress tests have been developed to accelerate the impact of these environmental exposures upon the suspension components. The pressure cooker test subjects to 121° C., 2 Atm. pressure, and 100% relative humidity (RH) for 168 hours. Use adhesion promoting layers has been shown to perform effectively in these tests.

Etching of these adhesion promoting layers in processing must be carried out as a separate step since their solubility is different from the other laminate layers, such as the copper seed layer usually used. An etching of chromium adhesion layers can result in the presence of hexavalent chromium in the effluent, an environmentally hazardous and unacceptable course.

BRIEF SUMMARY OF THE INVENTION

It is an object of the invention therefore to provide a method for the manufacture of gimbal suspension elements free of the foregoing problems. It is a further object to provide a method of creating a base composite sandwich, or shaped element laminate, comprising a structural stainless layer about 18-25 um in thickness, a plastic layer, and a conductive layer that will survive the presently used stress tests, require less use of environmentally unfriendly processes, and yield products of comparable performance. It is a further object to provide gimbal suspension element manufacture with fewer process steps. A further object is to use an adhesion promoting interlayer that is etchable with the seed layer adjacent to it. A still further object is to provide an intermediate gimbal suspension element product.

These and other objects of the invention to become apparent hereinafter are realized in a method of shaping a gimbal suspension element for a disk drive suspension, including disposing an element precursor assembly of a plastic film layer and a conductive layer with an interlayer of a by weight predominantly nickel nickel-copper alloy and copper for application of an etchant, and subjecting the element precursor to an element shaping etchant for both the alloy and the copper seed layer of the interlayer to shape the element.

In this and like embodiments, typically, the method also includes selecting as the alloy a Monel alloy comprising 68 weight percent nickel, and copper, selecting as the alloy a Monel alloy comprising 32 weight percent copper, and nickel, selecting as the alloy a Monel alloy consisting essentially of about 68 weight percent nickel and about 32 weight percent copper, selecting as the etchant cupric chloride, selecting as the plastic film layer a polyimide layer, and selecting copper as the conductive layer.

The invention further includes the products of the invention methods.

The invention further includes a disk drive suspension gimbal suspension element intermediate comprising an element precursor assembly of a plastic film layer and a conductive layer with an interlayer of copper and a by weight predominantly nickel nickel-copper alloy, and an etchant solution in etching amount bathing the assembly.

In this and like embodiments, typically, the invention typically includes the alloy being a Monel alloy consisting essentially of about 68 weight percent nickel and about 32 weight percent copper, the etchant comprising cupric chloride, the plastic film layer comprising polyimide, the conductive layer comprising copper, the Monel alloy consisting essentially of about 68 weight percent nickel and about 32 weight percent copper, and the etchant comprising cupric chloride.

BRIEF DESCRIPTION OF THE SEVERAL VIEWS OF THE DRAWINGS

The invention will be further described in conjunction with the attached drawings in which.

DETAILED DESCRIPTION OF THE INVENTION

In general terms, the invention provides a method of manufacture for gimbal suspension elements including forming a metallic bond between a conductive layer such as copper and a plastic layer such as polyimide layer using a Monel alloy that is predominantly nickel as an adhesion layer in lieu of using chromium or titanium, that can be co-etched, rather than separately etched, with the copper seed layer adjacent thereto, and an intermediate product of the method comprising the laminate and etchant.

Figure 1:
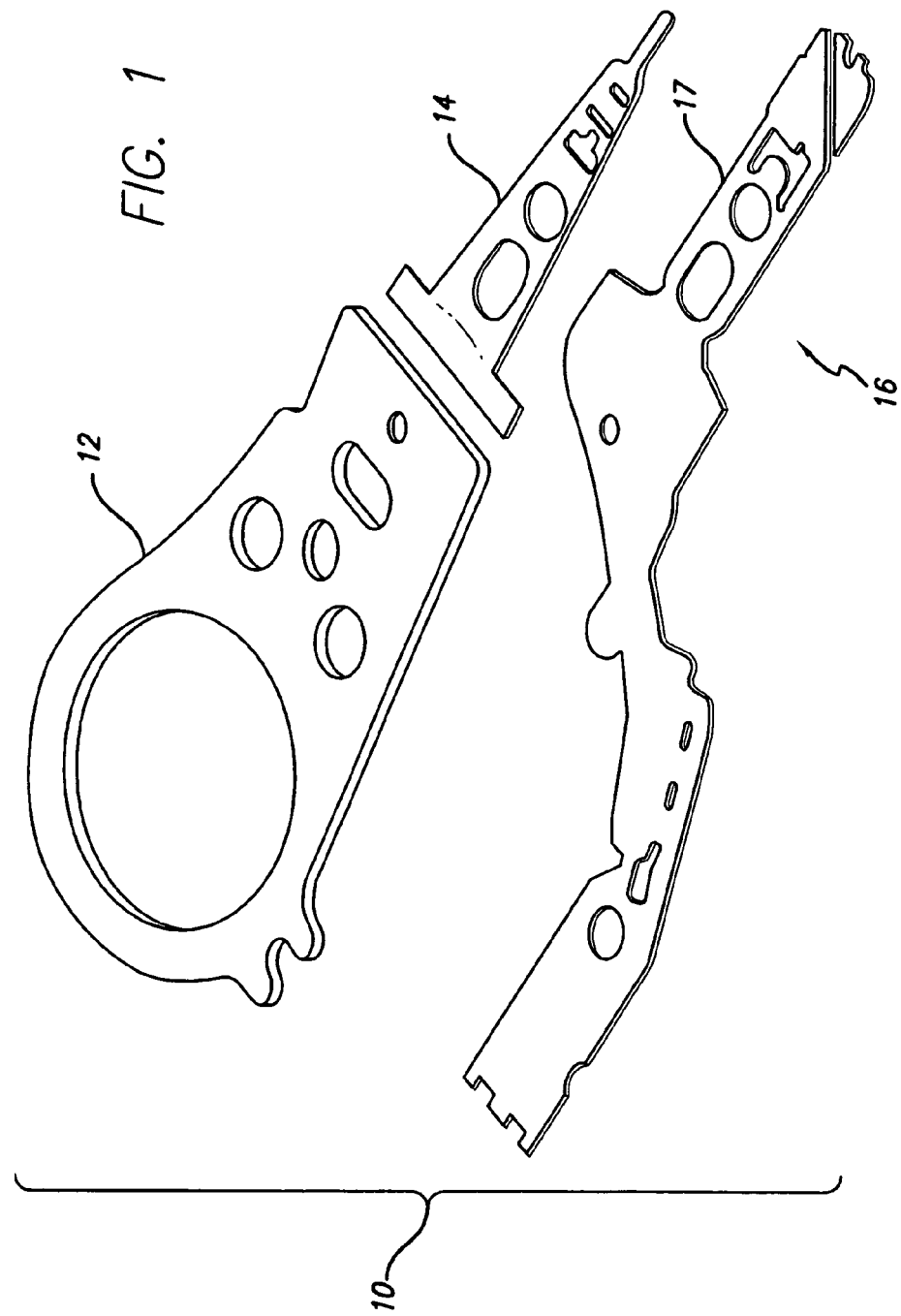
FIG. 1 is an oblique, exploded view of a disk drive suspension load beam and gimbal suspension element.
Figure 2:
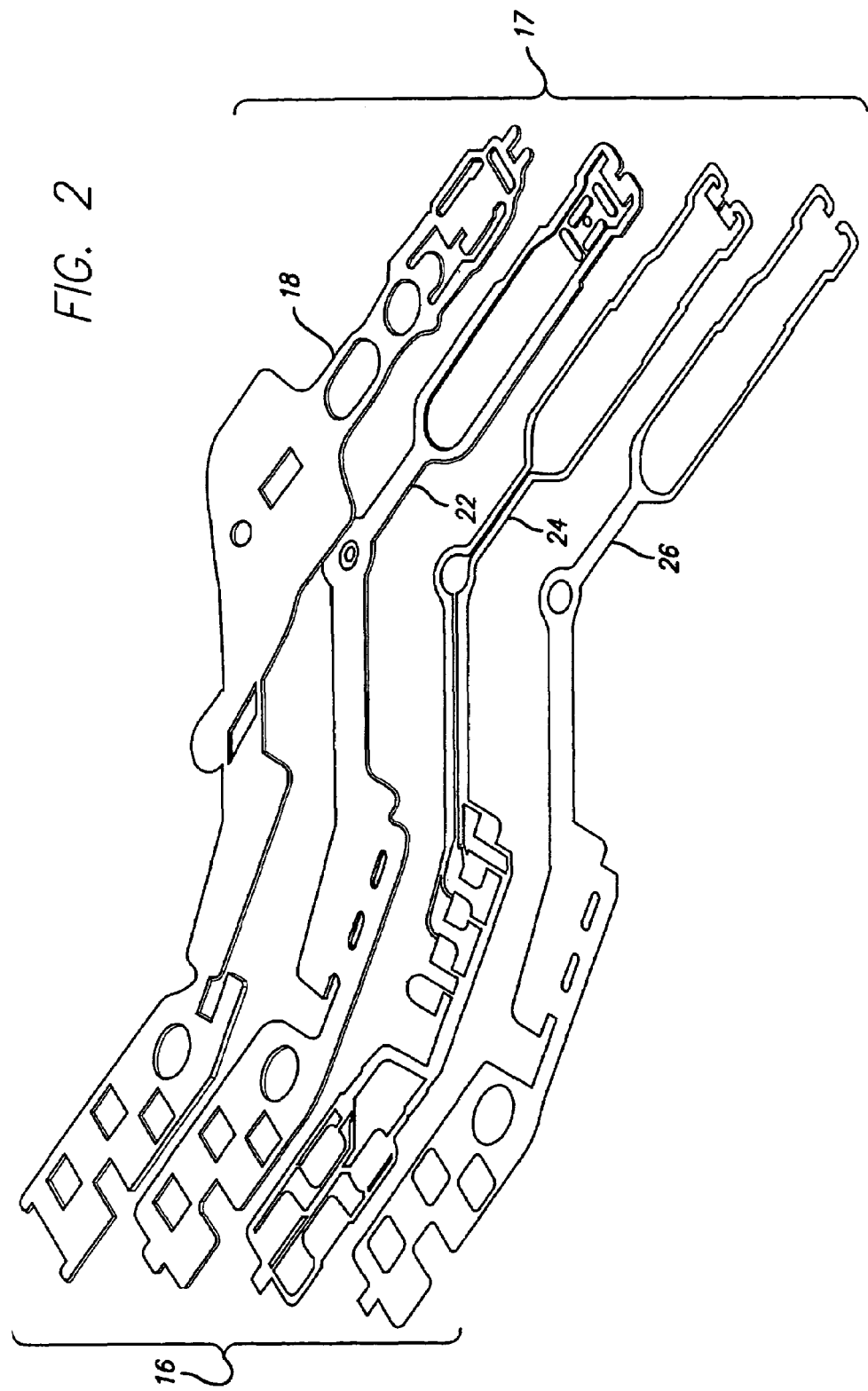
FIG. 2 is an oblique, exploded view of the plane view of the gimbal suspension element.

With reference now to the drawings in detail, in FIGS. 1 and 2 suspension 10 includes a load beam having a base portion 12 and a beam portion 14, and a gimbal suspension element 16. Gimbal suspension element 16 comprises an assembly 17 of multiple layers 18, 22, 24 and 26 normally bonded together and having the final shape shown after etching steps. Layer 18 is a stainless steel spring layer, layer 22 is a plastic film, e.g. polyimide layer, layer 24 is a conductive, e.g. copper layer, and layer 26 is a protective plastic layer covering the conductive traces 28.

Figure 3:
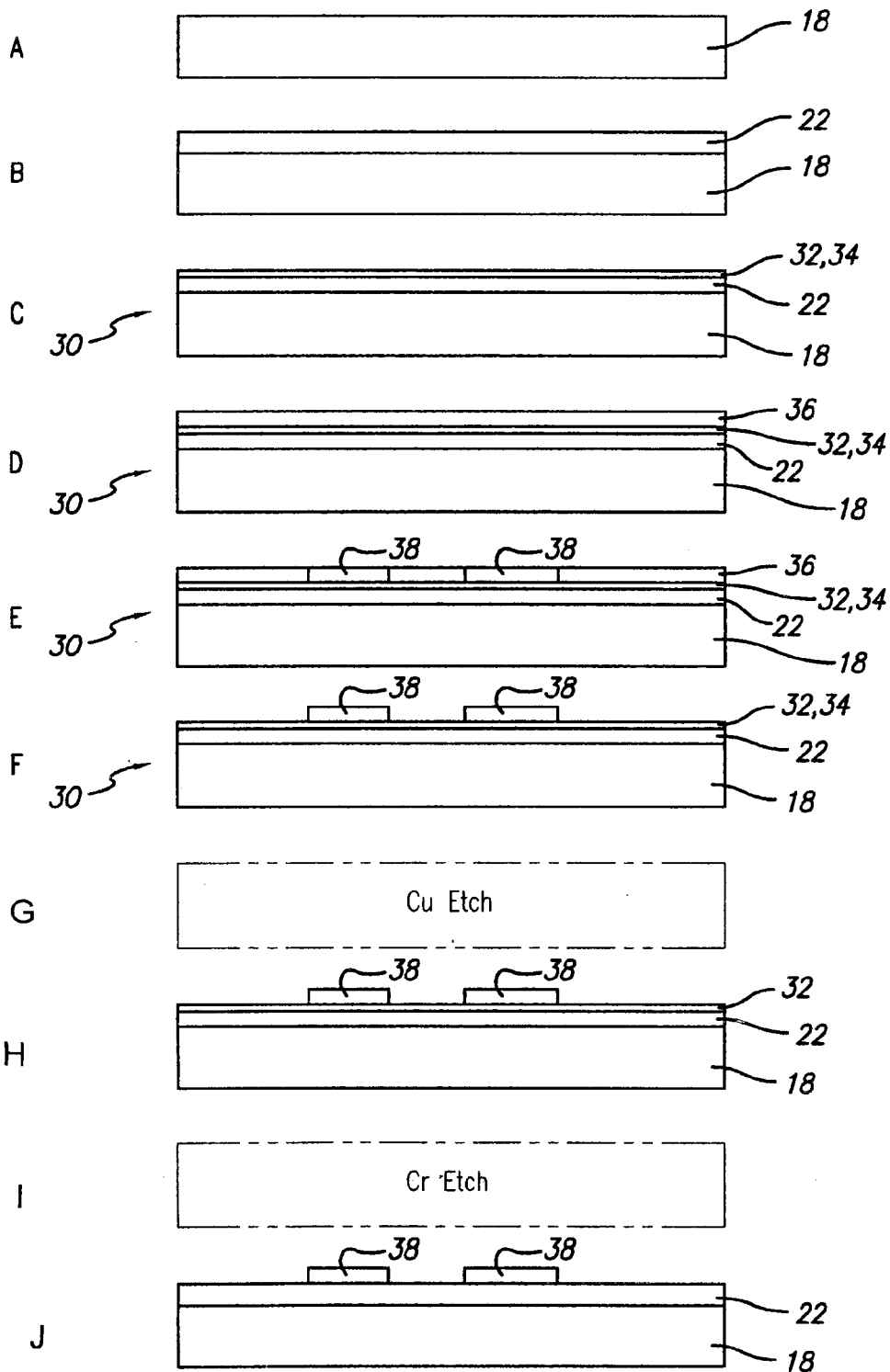
FIG. 3 is a schematic view of PRIOR ART gimbal suspension element manufacture.

With reference to FIG. 3, the PRIOR ART process involves adding to a stainless steel foil layer 18 (Step A) a cast and cured polyimide layer 22 (Step B), sputtering an interlayer 30 comprising a chromium tie layer 32 and a copper seed layer 34 into the polyimide layer (Step C), applying a photoresist 36 (Step D), exposing the circuit image and electrodepositing copper traces 38 thereon (Step E), stripping the photoresist 36 (Step F), etching the copper seed layer 34 to obtain etched intermediate product (Step H), and separately etching the chromium tie layer 32 (Step I) to obtain the shaped gimbal suspension element (Step J). Hexavalent chromium effluent can result.

Figure 4:
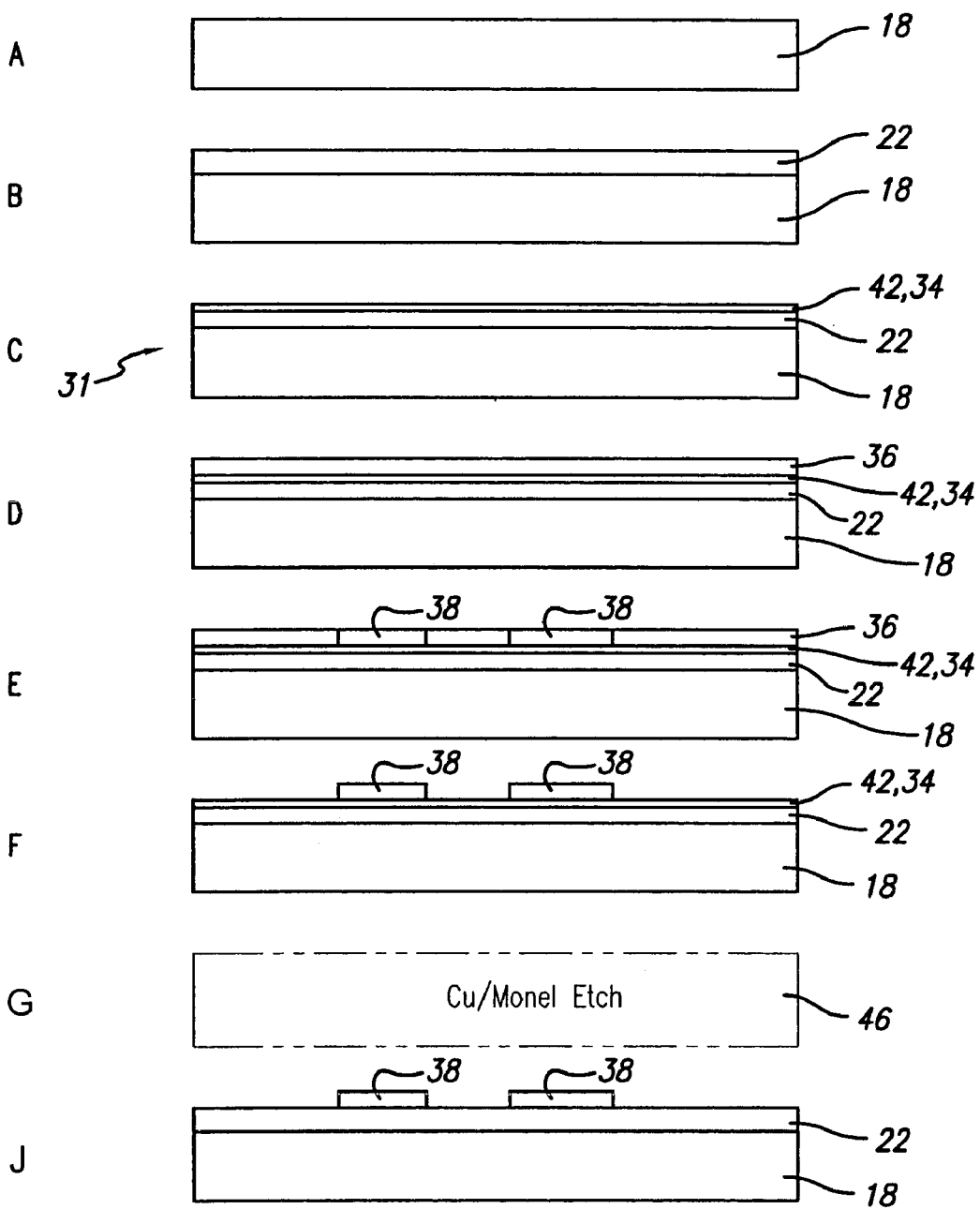
FIG. 4 is a schematic view of the invention gimbal suspension element manufacture.

With reference to FIG. 4, the invention manufacturing method includes adding to a stainless steel foil layer 18 (Step A) a cast and cured polyimide layer 22 (Step B), sputtering a Monel, predominantly nickel alloy tie layer 42 and a copper seed layer 34 interlayer 31 onto a polyimide layer (Step C), applying a photoresist 36 (Step D), exposing the circuit image and electrodepositing copper traces 38 thereon (Step E), stripping the photoresist 36 (Step F), etching the copper seed layer 34 and the Monel alloy tie layer simultaneously by bathing with cupric chloride etchant (Step G), to obtain the shaped product (Step J), eliminating the separate, sequenced copper seed layer and chromium tie layer etching steps G and I of the prior art, FIG. 3. No hexavalent chromium is generated.

In summary, the invention method of shaping a gimbal suspension element 16 for a disk drive suspension, includes disposing an element precursor assembly 17 of a plastic film layer 22 and a conductive layer 24 with an interlayer 31 of copper seed layer and a by weight predominantly nickel nickel-copper alloy for application of an etchant, and subjecting the element precursor to an element shaping etchant 46 for both the alloy interlayer 31 and the copper seed layer 34 to shape the element 16.

Preferably, there is selected as the alloy a Monel alloy comprising 68 weight percent nickel, and copper, or a Monel alloy comprising 32 weight percent copper, and nickel, or a Monel alloy consisting essentially of about 68 weight percent nickel and about 32 weight percent copper. Preferably selected as the etchant cupric chloride. Preferably selected as the plastic film layer is a polyimide layer, and preferably selected as the conductive layer is a copper metal layer.

In the course of conducting the foregoing method, an intermediate product is produced, comprising the gimbal suspension precursor assembly 17 of a stainless steel layer 18, a plastic film layer 22 and a conductive layer 24 with an interlayer 31 of a by weight predominantly nickel nickel-copper alloy, and an etchant 46 solution in etching amount bathing the assembly.

The invention thus provides a method for the manufacture of gimbal suspension elements including creating a base composite sandwich, or shaped element laminate, comprising a structural stainless layer about 18-25 um in thickness, a plastic layer, and a conductive layer that will survive the presently used stress tests, require less use of environmentally unfriendly processes, and yield products of comparable performance, and with fewer process steps, using an adhesion promoting predominantly nickel nickel alloy that is etchable with the copper seed layer adjacent to it, and a final and intermediate gimbal suspension element product. The foregoing objects are thus met.

We claim:

1. A method of shaping a gimbal suspension element for a disk drive suspension, including disposing an element precursor assembly of a plastic film layer and a conductive layer with an interlayer of a copper seed layer and a by weight predominantly nickel nickel-copper alloy for application of an etchant, and subjecting said element precursor assembly to an element shaping etchant for both the alloy and the copper seed layer to shape said gimbal suspension element.

2. The method according to claim 1, including also selecting as said alloy a Monel alloy comprising 68 weight percent nickel, and copper.

3. The method according to claim 1, including also selecting as said alloy a Monel alloy comprising 32 weight percent copper, and nickel.

4. The method according to claim 1, including also selecting as said alloy a Monel alloy consisting essentially of about 68 weight percent nickel and about 32 weight percent copper.

5. The method according to claim 1, including also selecting as said etchant cupric chloride.

6. The method according to claim 1, including also selecting as said plastic film layer a polyimide layer.

7. The method according to claim 6, including also selecting as said alloy a Monel alloy consisting essentially of about 68 weight percent nickel and about 32 weight percent copper.

8. The method according to claim 7, including also selecting as said etchant cupric chloride.

9. The method according to claim 8, including also selecting copper as said conductive layer.

10. The method according to claim 1, wherein said alloy consists essentially of about 68 weight percent nickel.

11. The method according to claim 1, wherein said alloy is a Monel alloy.

12. The method according to claim 1, wherein said subjecting said element precursor assembly to an element shaping etchant comprises subjecting said element precursor assembly to an etchant that etches both the alloy and the copper seed layer to shape said gimbal suspension element.

13. The method according to claim 12 wherein said etchant comprises cupric chloride, whereby said cupric chloride etches both the predominantly nickel nickel-copper alloy and the copper seed layer to shape said gimbal suspension element.

* * * * *